(12) United States Patent
Alpert et al.

(10) Patent No.: US 12,336,010 B2
(45) Date of Patent: Jun. 17, 2025

(54) OVER-THE-AIR BLE LINK-CLUSTER OPERATION

(71) Applicant: TEXAS INSTRUMENTS INCORPORATED, Dallas, TX (US)

(72) Inventors: Yaron Alpert, Hod Hasharon (IL); Yuval Matar, Kiryat Mozkin (IL)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 267 days.

(21) Appl. No.: 17/703,841

(22) Filed: Mar. 24, 2022

(65) Prior Publication Data
US 2023/0309146 A1  Sep. 28, 2023

(51) Int. Cl.
| | | |
|---|---|---|
| H04W 74/08 | (2024.01) | |
| H04L 5/00 | (2006.01) | |
| H04W 72/0446 | (2023.01) | |
| H04W 74/0808 | (2024.01) | |
| H04W 76/15 | (2018.01) | |

(52) U.S. Cl.
CPC ....... H04W 74/0825 (2013.01); H04L 5/0073 (2013.01); H04W 72/0446 (2013.01); H04W 76/15 (2018.02)

(58) Field of Classification Search
CPC ............. H04W 74/0825; H04W 74/04; H04W 72/0446; H04W 76/15; H04W 84/18; H04L 5/0073
See application file for complete search history.

(56) References Cited

U.S. PATENT DOCUMENTS

| | | | | |
|---|---|---|---|---|
| 7,869,432 B1 * | 1/2011 | Mollyn | ............... | H04L 12/4641 |
| | | | | 370/257 |
| 11,051,296 B2 * | 6/2021 | Klemmensen | .......... | H04W 4/08 |
| 2020/0221542 A1 * | 7/2020 | Bitran | .................... | H04W 84/18 |
| 2020/0396017 A1 * | 12/2020 | Liu | ......................... | H04W 4/80 |

OTHER PUBLICATIONS

Wooley, M., "Bluetooth Core Specification Version 5.3 Feature Enhancements," Revised Jun. 24, 2021, 40 p.

* cited by examiner

Primary Examiner — Jamal Javaid
(74) Attorney, Agent, or Firm — Michelle F. Murray; Frank D. Cimino

(57) ABSTRACT

A device includes a BLUETOOTH low energy (BLE) link layer (LL) controller configured to maintain links of a link cluster between the device and one or more connected devices that share parameters associated with the link cluster and process packets associated with the links at a LL. The links of the link cluster are established according to a BLE communication standard. The parameters include coordination parameters for connection events on the links and synchronization parameters for packet transmission in the connection events. The device further includes BLE physical link (PHY) interfaces coupled to the BLE LL controller and configured to exchange the packets in the connection events on the links, interface with the BLE LL controller, and process the packets at a PHY layer according to the parameters.

20 Claims, 12 Drawing Sheets

OVER-THE-AIR BLE LINK-CLUSTER OPERATION

BACKGROUND

BLUETOOTH low energy (BLE) is a wireless communication technology useful for various applications and devices, such as in healthcare, fitness, security, home entertainment, and communication devices. The BLE communication technology provides for lower power consumption of communication devices in comparison to BLUETOOTH or other wireless communication technologies, while also maintaining a similar wireless communication range and coverage. The reduced power consumption of the communication devices may be achieved by reducing device connection time in comparison to BLUETOOTH or the other wireless communication technologies. The BLE communication technology is based on a BLE communication standard supported by various operating systems (OS), including ANDROID, IOS, WINDOWS, MACOS, LINUX, and other OS to operate the communication devices.

SUMMARY

In accordance with at least one example of the disclosure, a device includes a BLE link layer (LL) controller configured to maintain links of a link cluster between the device and one or more connected devices that share parameters associated with the link cluster and to process packets associated with the links at a LL, where the links of the link cluster are established according to a BLE communication standard, and the parameters include coordination parameters for connection events on the links and synchronization parameters for packet transmission in the connection events. The device also includes BLE physical link (PHY) interfaces coupled to the BLE LL controller and configured to exchange the packets in the connection events on the links, interface with the BLE LL controller, and process the packets at a PHY layer according to the parameters.

In accordance with at least one example of the disclosure, a system includes transceivers that each include a BLE LL controller configured to maintain links of a link cluster between a device and one or more connected devices that share parameters associated with the link cluster and to process packets associated with the links at a LL, where the links of the link cluster are established according to a BLE communication standard, and the parameters include coordination parameters for connection events on the links and synchronization parameters for packet transmission in the connection events. Each transceiver also includes BLE PHY interfaces coupled to the BLE LL controller and configured to exchange the packets in the connection events on the links, interface with the BLE LL controller, and process the packets at a PHY layer according to the parameters. The system also includes a modem including an application layer manager configured to process data at an application layer, a host layer manager configured to manage host device functions and interface with the application layer manager, and a host to controller interface (HCI) configured to provide a communication interface between the host layer manager and the BLE LL controller.

In accordance with at least one example of the disclosure, a method includes obtaining, by a first device, coordination parameters for coordinating connection events on links established between the first device and a second device; obtaining synchronization parameters for synchronizing transmission and reception of packets in the connection events on the links; scheduling according to the coordination parameters the connection events at different respective transmission frequencies among the links; determining according to the synchronization parameters start and end times for first overlapping intervals in time and second overlapping intervals in time within the connection events on the links, where the first overlapping intervals in time do not overlap with the second overlapping intervals in time on the links; transmitting at the first overlapping intervals in time, to the second device, first packets of the packets in transmission events in the connection events on the links; and receiving at the second overlapping intervals in time, from the second device, second packets of the packets in reception events in the connection events on the links.

DETAILED DESCRIPTION

Figure 1:
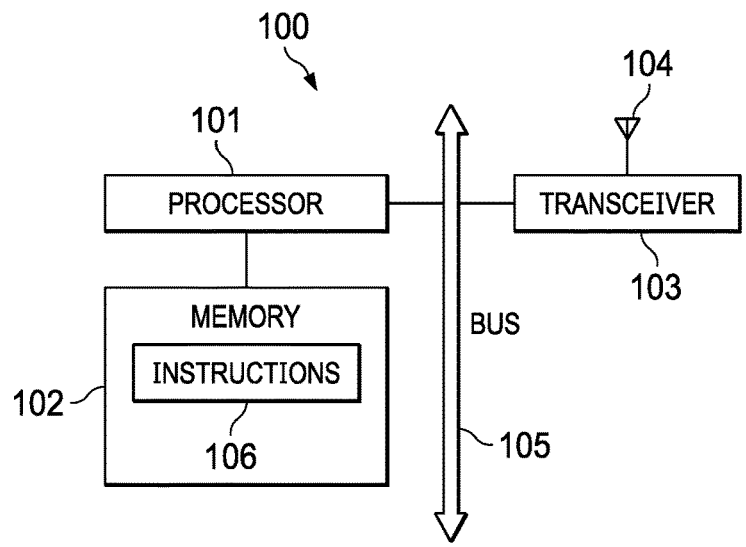
FIG. 1 is a block diagram of a processing and communication system, in accordance with various examples.

According to the BLE communication standard in the Bluetooth Core Specification Verification 5.3, which is incorporated herein by reference, data transfers may be carried over links, which are connections established between communication devices to exchange data in the form of messages or packets. The communication devices, which are also referred to as BLE devices, include a central device and one or more peripheral devices. The peripheral devices may have limited power available in comparison to the central device. For example, the central device may be a smartphone, a tablet, or a laptop. The peripheral device may be a sensor device or a wearable device, such as a temperature sensor or a wireless earphone, that has a smaller battery or a battery with a more limited power storage than the central device. The central device may also have a power supply other than a battery, such as a gateway or a computer device plugged to a power outlet. The links between the BLE devices are wireless links that can be established via radio frequency (RF) connections.

A group of BLE devices can communicate in a multi-peripherals mode in which multiple peripheral devices are connected to a single central device via respective links. In the multi-peripherals mode there may be a single BLE link between each peripheral device and the central device. A group of BLE devices may also communicate in a multi-centrals mode in which multiple central devices are connected to a single peripheral device via respective links. In the multi-centrals mode there may be a single BLE link between each central device and the peripheral device. In either mode, the same peripheral device may be limited according to the BLE device architecture to a single BLE link with the same central device.

The description provides examples to enable the BLE device architecture to exchange data on multiple links between a BLE device and one or more other BLE devices. The group of links established between the BLE devices, also referred to herein as a link cluster, includes multiple links between the same BLE devices. The BLE devices connected by a link cluster may share the same parameters related to the link cluster. The established link cluster can be useful to transmit data in the direction from the BLE device, also referred to herein as uplink, or in the direction to the BLE device, also referred to herein as downlink. The data can be transmitted on different links, within the link cluster, in the same direction (e.g., uplink or downlink) or in different directions (e.g., uplink and downlink). The messages or packets transmitted on the links may be separated by transmission gaps in time. For example, a message or packet may be transmitted on a first link during a transmission gap for a second link, or in parallel to other transmissions on one or more links.

The BLE device architecture that supports the link cluster, also referred to herein as a BLE link-cluster architecture, is configured to coordinate and synchronize the transmission of data on the multiple links between the same BLE devices. The coordination and synchronization of data transmission includes coordinating connection events on the multiple links that connect the BLE devices. The coordination of the connection events includes scheduling and exchanging coordination parameters including the starting times, also referred to herein as anchoring points, of connection events on the links, the frequency for transmission of each connection event, and the duration of the connection events on the links. A connection event on a link is an interval during which data is being transmitted or received on the link. The synchronization and coordination of data transmission also include synchronizing the transmission of packets in connection events on the multiple links. The synchronization of packet transmission in connection events includes configuring and exchanging synchronization parameters including the direction (e.g., uplink or downlink), the rate, the power, and/or the duration of the transmission of packets on the links.

The BLE link-cluster architecture can support a group of BLE devices that communicate in both the multi-peripherals mode and the multi-centrals mode. For example, a BLE device may be a first central device connected to one or more peripheral devices and, simultaneously, may also be a peripheral device connected to one or more other central devices. The BLE device connected by a link cluster to one or more other BLE devices is also referred to herein as link-cluster BLE device (LCB).

The BLE link-cluster architecture configures the LCB, which may be a central device or a peripheral device, with multiple BLE PHY layers and a single BLE logical link control (LLC) layer, also referred to herein as a BLE LL, for data processing and handling. The multiple links of the link cluster connect the same LCB with another LCB to transmit and receive data in the form of messages, packets, or fragments of packets on the uplink or downlink. The BLE link-cluster architecture is aware of and accordingly coordinates the transmission on the multiple links within the link cluster. The BLE link-cluster architecture synchronizes the transmission and reception of the LCB and enables the transmission or reception over the multiple links within the link cluster, simultaneously. For example, the coordination of the connection events can be provided at the BLE LL, and the synchronization of packet transmission can be provided at the BLE PHY layers.

The BLE link-cluster architecture also enables packets fragmenting and reassembly on multiple links within the link cluster, packet or fragment duplication, duplicated packets or fragments detection, dynamic switching of packets or fragments on the links within the link cluster, simultaneous transmission and reception of packets or fragments on different links within the link cluster, and packet or fragment retransmission on different links within the link cluster.

The transmission and reception can be coordinated on the multiple links within the link cluster to reduce cross-link interference among the links of the same LCB and between different LCB connected by the link cluster, such as by transmitting the signals that carry the data on the links at different respective frequencies. The messages or packets can be distributed over the multiple links within the link cluster to increase communication throughput. Distributing the transmission over multiple links also reduces latency, response time, and power consumption of the LCB. In other examples, the messages or packets can be replicated and transmitted over the multiple links to provide redundancy and accordingly increase the robustness of communications.

FIG. 1 is a block diagram of a processing and communication system 100 useful for processing and exchanging data, in accordance with various examples. The processing and communication system 100 may be a BLE device or LCB which is capable of establishing a connection to transmit and receive messages or packets in accordance with a BLE communication standard. For example, the processing and communication system 100 may be a central device, such as a router, a computer device or a smartphone, or may be a peripheral device such as an Internet of Things (IoT) device, a sensor or other BLE device capable of establishing a connection with a second BLE device or a network, such as the Internet. In some examples, the processing and communication system 100 may be a system on a chip (SoC), an electronic circuit board or a computer card of a BLE device.

The processing and communication system 100 includes hardware components for establishing a connection and transmitting and receiving data in accordance with the BLE communication standard. As shown in FIG. 1, the processing and communication system 100 may include one or more processors 101 and one or more memories 102. The processing and communication system 100 may also include one or more transceivers 103 and one or more antennas 104 for establishing wireless connections. These components may be coupled through a bus 105, or in any other suitable manner. In FIG. 1, an example in which the components are coupled through a bus 105 is shown.

The processor 101 is configured to read and execute computer-readable instructions. For example, the processor 101 is configured to invoke and execute instructions in a program stored in the memory 102, including instructions 106. Responsive to the processor 101 transmitting data, the processor 101 drives or controls the transceiver 103 to perform the transmitting. The processor 101 also drives or controls the transceiver 103 to perform receiving, responsive to the processor 101 receiving data. Therefore, the processor 101 may be considered as a control center for performing transmitting or receiving data and the transceiver 103 is an executor for performing the transmitting and receiving operations.

In some examples, the memory 102 is coupled to the processor 101 through the bus 105. In other examples, the memory 102 is integrated with the processor 101. The memory 102 is configured to store various software programs and/or multiple groups of instructions, including the instructions 106. The memory 102 may include one or more storage devices. For example, the memory 102 includes a high-speed random-access memory and/or may include a nonvolatile memory such as one or more disk storage devices, a flash memory, another nonvolatile solid-state storage device, or a pseudostatic random-access memory (PSRAM). The memory 102 may store an OS such as ANDROID, IOS, WINDOWS or LINUX. The memory 102 may further store a network communications program. The network communications program is useful for performing communications with one or more attached devices, one or more user equipments, or one or more network devices. The memory 102 may further store a user interface program. The user interface program displays content of an application through a graphical interface and receive data or an operation performed by a user on the application via an input control such as a menu, a dialog box or a physical input device (not shown). The memory 102 is configured to store the instructions 106 for implementing the various methods and processes provided in accordance with the various examples of this description.

The transceiver 103 includes a transmitter and a receiver. The transceiver 103 is configured to transmit one or more signals that is provided by the processor 101. The transceiver 103 is also configured to receive one or more signals from other devices or equipments. In this example, the transceiver 103 may be considered a wireless transceiver. The antenna 104 may be configured to enable the exchanging of wireless communication signals between the transceiver 103 and a network or another system or device.

The processing and communication system 100 may also include another communication component such as a Global Positioning System (GPS) module, cellular module, a BLUETOOTH or BLE module, Zigbee module, Long Term Evolution (LTE), LTE-Machine Type Communication (LTE-M), Narrow Band LTE (NB-LTE), Sub-Gigahertz Communication (sub1G), or a Wireless Fidelity (WI-FI) module. The processing and communication system 100 may also support another wireless communication signal such as a satellite signal or a short-wave signal. The processing and communication system 100 may also be provided with a wired network interface or a local area network (LAN) interface to support wired communication.

In various examples, the processing and communication system 100 may further include an input/output interface (not shown) for enabling communications between the processing and communication system 100 and one or more input/output devices (not shown). Examples of the input/output devices include an audio input/output device, a key input device, a display and the like. The input/output devices are configured to implement interaction between the processing and communication system 100 and a user or an external environment. The input/output device may further include a camera, a touchscreen, a sensor, and the like. The input/output device communicates with the processor 101 through a user interface.

The processing and communication system 100 shown in FIG. 1 is an example of a processing and communication system or device. During actual application, the processing and communication system 100 may include more or fewer components. The processing and communication system 100 may be part of a BLE device or LCB that is connected to other BLE devices or LCBs.

Figure 2:
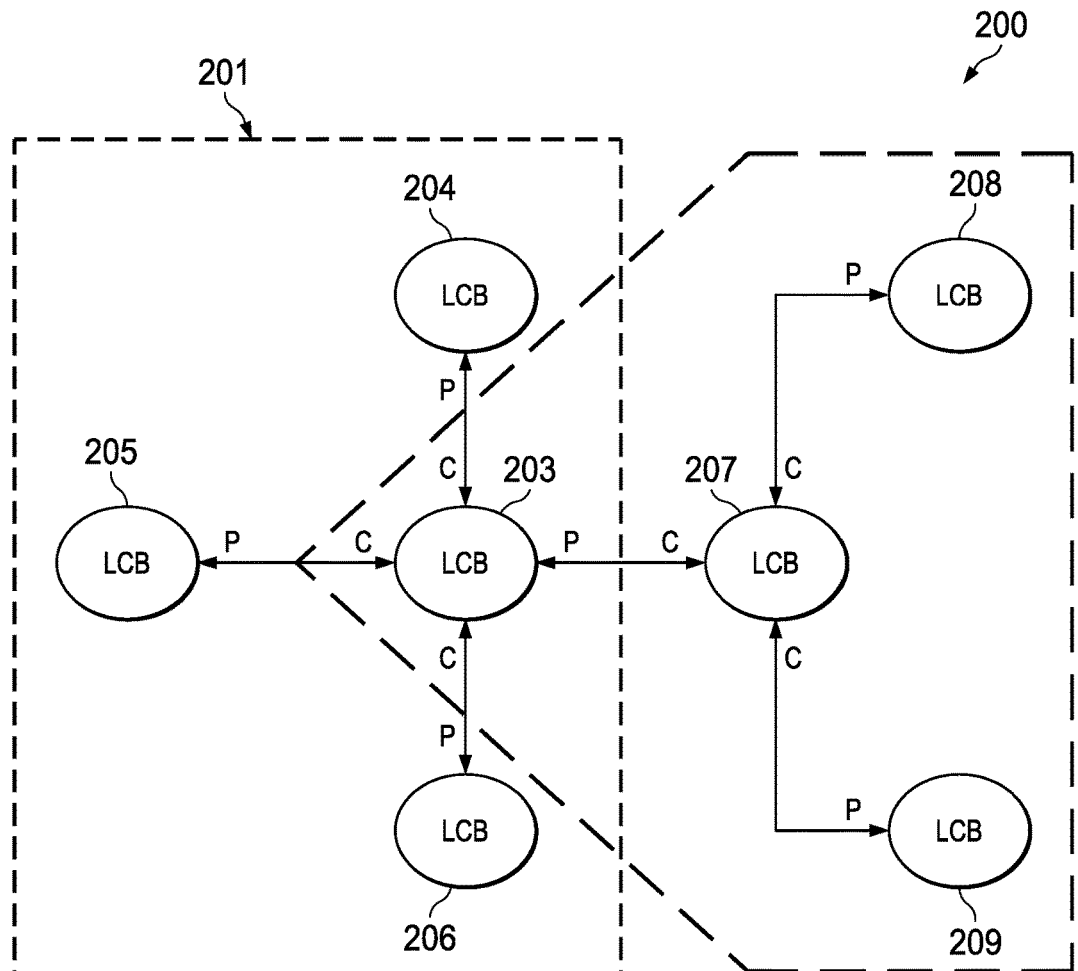
FIG. 2 is a diagram of a group of connected BLE devices, in accordance with various examples.

FIG. 2 is a diagram of a group 200 of connected LCBs, in accordance with various examples. The group 200 of LCBs includes a first network 201 and a second network 202 of LCBs that communicate with each other. The first network 201 includes a first central device 203 connected in a multi-peripherals mode via respective links (designated in FIG. 2 as central device (C) to peripheral device (P) links) to a first peripheral device 204, a second peripheral device 205, and a third peripheral device 206. The second network 202 includes a second central device 207 also connected in a multi-peripherals mode via respective links to a fourth peripheral device 208 and a fifth peripheral device 209. The first central device 203 is also connected as a peripheral device to the second central device 207.

In the group 200, a pair of connected LCBs is configured, according to a BLE link-cluster architecture, to establish multiple links simultaneously. For example, the first central device 203 can establish two links simultaneously (not shown) with the first peripheral device 204. A LCB can also establish multiple links with more than one other LCB. For example, the first central device 203 can establish simultaneously first two links with the first peripheral device 204 and second two links with the second central device 207.

Figure 3:
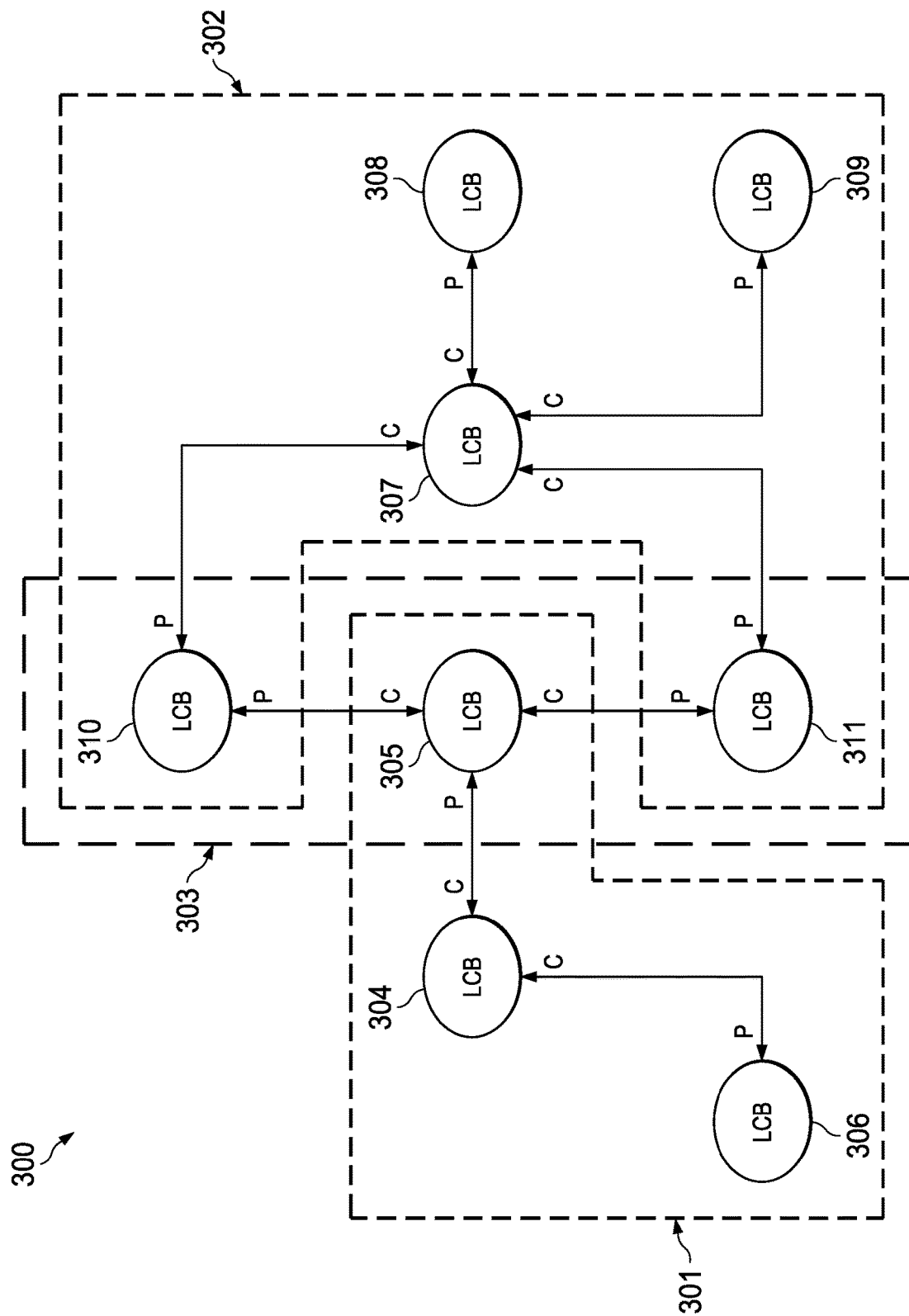
FIG. 3 is a diagram of a group of connected BLE devices, in accordance with various examples.

FIG. 3 is a diagram of a group 300 of connected LCBs which may include SoCs or electronic circuit boards, in accordance with various examples. The group 300 of LCBs includes a first network 301, a second network 302 and a third network 303 of LCBs that communicate with each other. The first network 301 includes a first central device 304 connected in a multi-peripherals mode via respective links (designated in FIG. 3 as C P links) to a first peripheral device 305 and a second peripheral device 306. The second network 302 includes a second central device 307 connected in a multi-peripherals mode via respective links to a third peripheral device 308, a fourth peripheral device 309, a fifth peripheral device 310 and a sixth peripheral device 311. The third network 303 includes the first peripheral device 305, the fifth peripheral device 310, and the sixth peripheral device 311.

As shown in FIG. 3, the first peripheral device 305 is also connected as a central device in a multi-peripherals mode to the fifth peripheral device 310 and the sixth peripheral device 311. The fifth peripheral device 310, and similarly the sixth peripheral device 311, are each connected in a multi-centrals mode to both the second central device 307 and the first peripheral device 305, which is also acting as a central device in third network 303.

In the group 300 of LCBs, similar to the group 200, a pair of connected LCBs is configured to establish multiple links simultaneously according to the BLE link-cluster architecture. For example, the fifth peripheral device 310 can establish two links simultaneously with the first peripheral device 305. The BLE link-cluster architecture also configures a LCB to establish multiple links simultaneously with multiple other BLE devices. For example, the second central device 307 can establish simultaneously three links with the fifth peripheral device 310 and two links with the sixth peripheral device 311. The BLE link-cluster architecture in the groups 200 and 300 coordinates and synchronizes the transmission over the multiple links of the link cluster to enable simultaneous transmission and/or reception of signals between the LCBs in a multi-peripherals mode, multi-centrals mode, or both.

Figure 4:
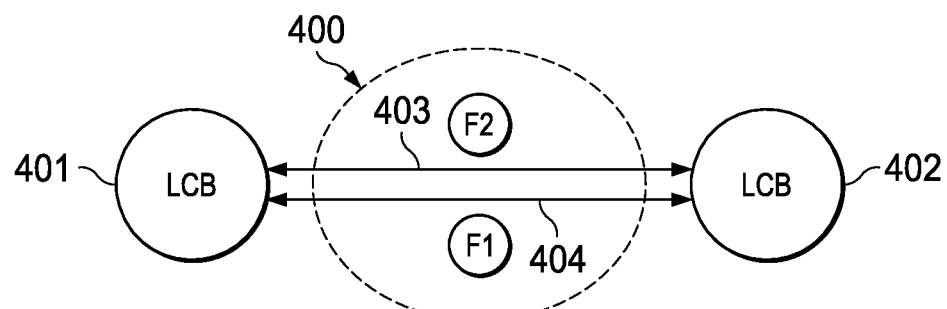
FIG. 4 is a diagram of a link cluster between BLE devices, in accordance with various examples.

FIG. 4 is a diagram of a link cluster 400 between LCBs, in accordance with various examples. The LCBs include a first LCB 401 and a second LCB 402 that are connected, simultaneously, via multiple links in the link cluster 400. For example, as shown in FIG. 4, the first LCB 401 is a central device and the second LCB 402 is a peripheral device with the first LCB 401 and the second LCB 402 being connected to each other, simultaneously, by a first link 403 and a second link 404. Accordingly, the first LCB 401 and the second LCB 402 can transmit or receive messages or frames on each of the first link 403 and the second link 404 simultaneously. The messages or frames may be transmitted on the first link 403 in the form of a first signal at a first frequency (F1) and on the second link 404 in the form of a second signal at a second frequency (F2). Transmitting the first signal and the second signal at different frequencies may reduce cross-link interference in the first signal on the first link 403 and the second signal on the second link 404 at the first LCB 401 and the second LCB 402.

In some examples, the messages or frames are distributed over the first link 403 and the second link 404 to increase communication throughput, reduce latency or response time, and/or reduce power consumption of the first LCB 401 and/or the second LCB 402. The messages or frames are distributed on the links by transmitting a first portion of the messages or frames on the first link 403 and a second portion of the messages or frames on the second link 404. In other examples, the messages or frames are replicated and transmitted as a first copy of messages or frames on the first link 403 and as a second copy of the same messages or frames on the second link 404, such as to provide redundancy and increase the robustness of communications.

Figure 5:
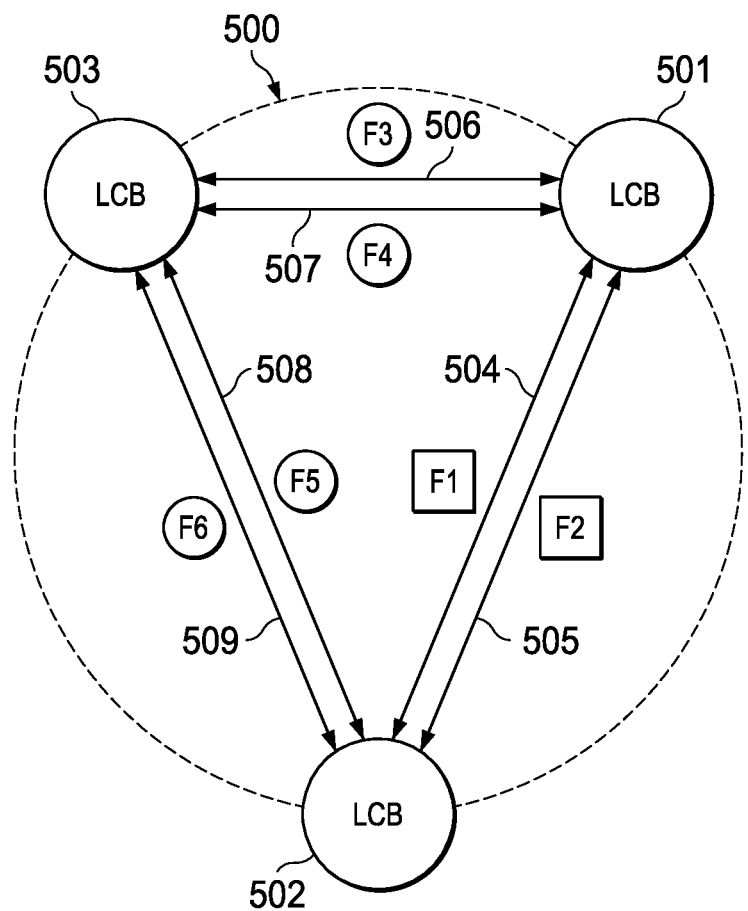
FIG. 5 is a diagram of a link cluster between BLE devices, in accordance with various examples.

In other examples, multiple links can be established in a link cluster between two or more LCBs, including between two peripheral devices. FIG. 5 shows a link cluster 500 between LCBs, in accordance with various examples. The LCBs include a first LCB 501, a second LCB 502, and a third LCB 503 that are connected between each other via multiple links in the link cluster 500. For the example, the first LCB 501 is a central device and the second LCB 502 is a first peripheral device connected to each other by a first link 504 and a second link 505 simultaneously. The third LCB 503 is a second peripheral device connected to the first LCB 501 by a third link 506 and a fourth link 507 simultaneously, and connected to the second LCB 502 by a fifth link 508 and a sixth link 509 simultaneously. Accordingly, the first LCB 501, the second LCB 502, and the third LCB 503 can transmit or receive messages or packets on each of the first, second, third, fourth, fifth and sixth links 504, 505, 506, 507, 508 and 509, or any combination thereof, simultaneously. To reduce cross-link interference among the links at the different LCBs and among the links at the same LCB, messages or packets may be transmitted on the first, second, third, fourth, fifth and sixth links 504, 505, 506, 507, 508 and 509 at the different frequencies F1, F2, F3, F4, F5 and F6, respectively.

In the examples of the link clusters 400 and 500, the LCBs are configured to establish multiple links between each other within a link cluster based on a BLE link-cluster architecture. The BLE link-cluster architecture configures the LCB, which may be a central device or a peripheral device, with multiple BLE PHY interfaces and a single BLE LL. The multiple BLE PHY interfaces allow a first LCB to establish multiple respective links with a second LCB or with multiple LCBs. The multiple BLE PHY interfaces are coupled to the same BLE LL at the LCB, which is aware of the messages or packets transmitted or received on each of the multiple links. Accordingly, the transmission of the messages or packets can be synchronized and coordinated on the multiple links at the LCB.

Figure 6:
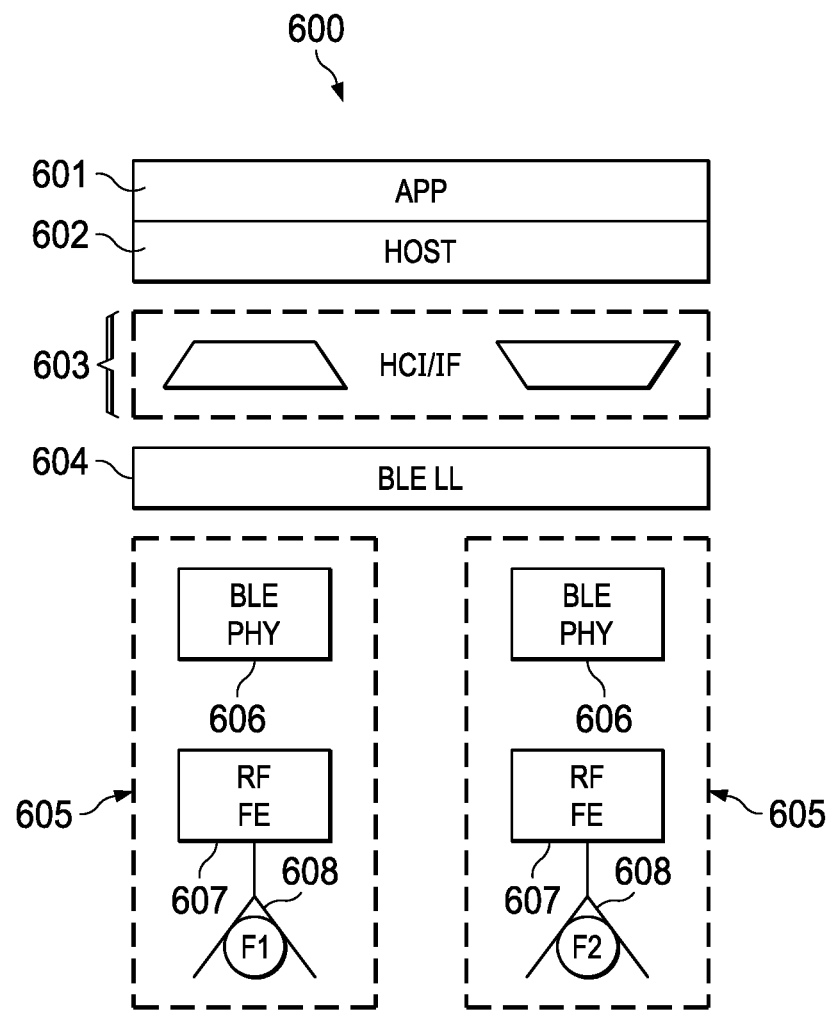
FIG. 6 is a diagram of a centralized BLE link-cluster architecture for establishing multiple links for a BLE device, in accordance with various examples.

FIG. 6 is a diagram of a centralized BLE link-cluster architecture 600 for establishing multiple links for a single BLE device, in accordance with various examples. The device BLE link-cluster architecture 600 provides a LCB with a capability of establishing with one or more other LCBs multiple links simultaneously via the device duplicate BLE PHY interfaces. The multiple links can increase the robustness of communications and communication throughput, as described above. The LCBs connected via the link cluster may include any combination of central devices and peripheral devices. The BLE link-cluster architecture 600 also enables an LCB that acts as both a central device and a peripheral device with other LCBs to establish respective links simultaneously with the other LCBs.

The centralized BLE link-cluster architecture 600 includes data handling blocks that are configured to process data and signals at different communication layers of a BLE protocol, according to the BLE communication standard. The data is processed and managed at the different communication layers in the arrangement order of the data handling blocks in the BLE link-cluster architecture 600. The data handling blocks can be implemented via software, hardware such as a circuit, or both. The data handling blocks are coupled to each other in the order shown in FIG. 6 and include an application layer manager (APP) 601, a host layer manager (Host) 602, a HCI 603, a BLE LL controller 604, and duplicate transceivers 605. The duplicate transceivers 605 include respective BLE PHY interfaces to the BLE LL controller 604. Each transceiver 605 includes a BLE PHY controller 606, a radio frequency front end (RF FE) 607, and a RF antenna 608. Each transceiver 605 is configured to establish a respective link at the LCB, transmit or receive data on the respective link, and manage the data at the signaling and RF levels.

The APP 601 interacts with BLE applications and profiles and manages data accordingly. The APP 601 processes the data of an application at the application level according to the application profile. For example, the BLE applications and profile are IoT applications and profiles. The Host 602 interfaces with the APP 601 and manages host device functions such as BLE device discovery, connection related services, security initiation, device pairing, security key exchange, data encapsulation, data attributes, or other application interface features. The HCI 603 provides communication between the Host 602 and the BLE LL controller 604 via a suitable communication interface type, such as an application programming interface (API), a universal asynchronous receiver-transmitter (UART), a serial peripheral interface (SPI), or a universal serial bus (USB).

The BLE LL controller 604 maintains simultaneously multiple links between the LCB of the BLE link-cluster architecture 600 and one or more connected LCBs to process data associated with the links at the LL. The BLE LL controller 604 also coordinates connection events on the multiple links. This can include scheduling and/or exchanging coordination parameters with the other LCBs. The coordination parameters can include the frequencies, the anchoring points, and the duration for each connection event of the links. The BLE LL controller 604 also synchronizes packet transmission in the connection events. This can include determining and/or exchanging synchronization parameters with the other LCBs. The synchronization parameters can include the direction (e.g., uplink or downlink), rate, power, and duration of packet transmissions on the links. The BLE LL controller 604 may handle advertising, scanning, and creating or maintaining connections of the respective links at the LCB. For example, the connections may be handled according to the transmission mode of the LCB (e.g., unicast or broadcast) or according to the role of the LCB (e.g., central or peripheral device, advertiser or scanner, broadcaster or observer). Examples of the LL states include scanning, advertising, initiating, connection, synchronization and standby states.

The transceivers 605 provide BLE PHY interfaces to the BLE LL controller 604. In each transceiver 605 that establishes a respective link of the links at the LCB, the BLE PHY controller 606 manages data exchange in a form of messages or packets on the links simultaneously and interfaces with the BLE LL controller 604. The BLE PHY controller 606 processes the data at the PHY layer including modulating the data for transmission according to a modulation scheme at a certain data rate and a certain frequency. The BLE PHY controller 606 also synchronizes packet transmission in connection events on the links. The synchronization includes configuring, according to the packet synchronization parameters, the direction (e.g., uplink or downlink), the rate, the power, and the duration of the transmission of packets in the coordinated connection events on the links. The RF FE 607 manages transmission and reflection of the data via the RF antenna 608. The data signals may be transmitted or received at different frequencies on the different links. For example, as shown in FIG. 6, the BLE link-cluster architecture 600 may provide two transceivers 605 that transmit or receive signals at F1 and F2 on two respective links simultaneously. The two links may connect a first LCB to a second LCB or to multiple other LCBs. For example, a first LCB configured with the BLE link-cluster architecture 600 may be a central device that connects to a first peripheral device with two links simultaneously, or connects to the first peripheral device with a first link and simultaneously to a second peripheral device with a second link.

In the centralized BLE link-cluster architecture 600, the data handling blocks are located in a single BLE device, such as a modem. In other examples, the BLE link-cluster architecture 600 may be implemented at multiple devices with close proximity, such as in the same room or building. In examples, the data handling blocks that form a BLE link-cluster architecture may also be located at different devices in one or more networks.

Figure 7:
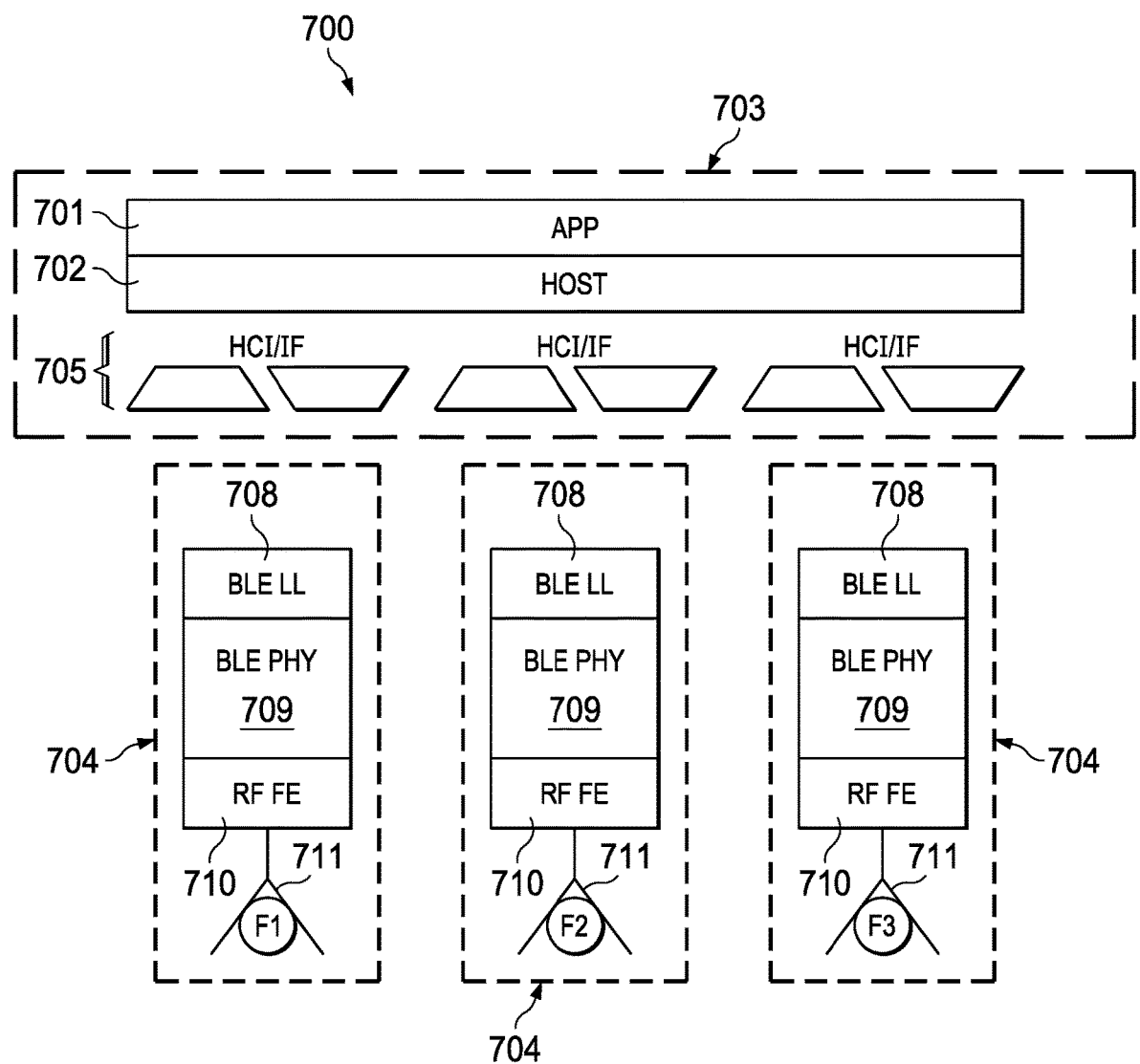
FIG. 7 is a diagram of a distributed BLE link-cluster architecture for establishing multiple links for a BLE device, in accordance with various examples.

In the PHY level distributed BLE link-cluster architecture 600, data is handled at the BLE LL in a centralized manner, such as in the modem. In other examples, BLE LL processing can be distributed with the BLE PHY interfaces at multiple devices. FIG. 7 is a diagram of a LL level distributed BLE link-cluster architecture 700 for establishing multiple links for a BLE device, in accordance with various examples. The distributed BLE link-cluster architecture 700 provides a LCB, such as a central device or a peripheral device, with the capability of establishing with one or more other LCB multiple links simultaneously via distributed BLE LL and BLE PHY interfaces. The BLE LL and BLE PHY interfaces can be distributed among different devices, such as at different wireless transmitter devices.

The LL level distributed BLE link-cluster architecture 700 includes data handling blocks for handling data and signals at different communication layers of the BLE protocol. The data handling blocks can be implemented via software, hardware, or both. The data handling blocks include, in the order shown in FIG. 7, an APP 701, a Host 702, and distributed sets of BLE LL and BLE PHY interfaces. The APP 701 and Host 702 may be located at a modem 703 of the LCB. The BLE LL and BLE PHY interfaces may be located at multiple transceivers 704 that are coupled to the modem 703 through wired or wireless connections or one or more networks. For example, the transceiver 704 may be a peripheral device, a remote control device, a router, or an IoT device that is plugged into the modem 703 or connected to the modem 703 through a LAN, the Internet, or any combination of communication networks. Each transceiver 704 can communicate with the modem 703 through a respective HCI 705 of the modem 703. Each transceiver 704 includes a BLE LL interface 708 that communicates with the respective HCI 705 at the modem 703 to perform LL level connection event coordination and packet synchronization. The transceiver 704 also includes a BLE PHY controller 709, a RF FE 710, and a RF antenna 711. Each transceiver 704 is configured to establish a respective link for the LCB, transmit or receive data on the respective link, and handle the data at the signaling and LL, PHY and RF levels.

In the BLE link-cluster architectures 600 and 700, the duplicate BLE PHY interfaces establish respective wireless links simultaneously via respective transceivers and RF antennas. In other examples, the wireless links can be established via a single transceiver and RF antenna to reduce power consumption by the RF circuit of the LCB.

Figure 8:
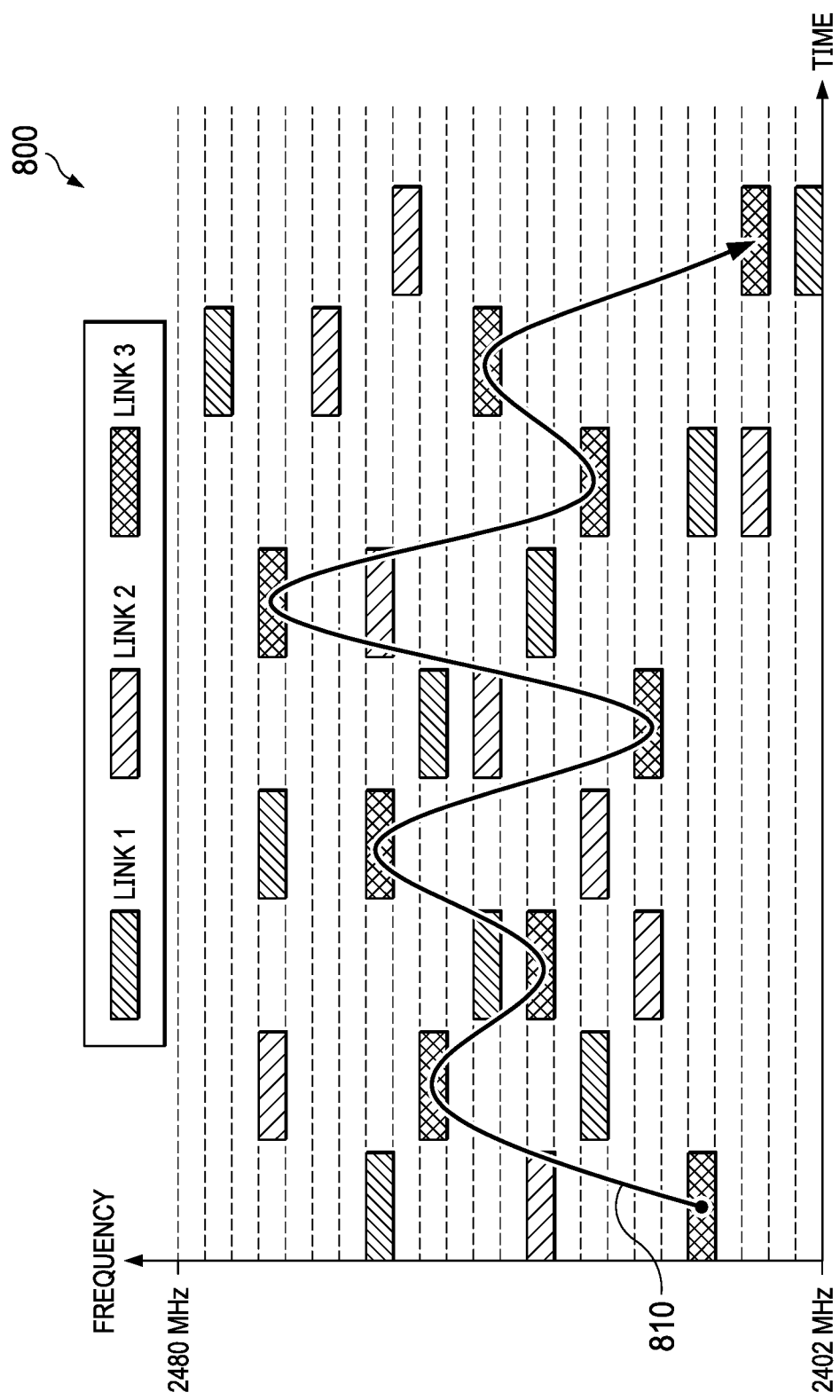
FIG. 8 is a graph showing coordinated connection events in a link cluster, in accordance with various examples.

FIG. 8 is a graph showing coordinated connection events 800 in a link cluster, in accordance with various examples. The x-axis represents a time range during which connections intervals are provided on respective links. The y-axis represents a range of frequencies, in megahertz (MHz), for the transmission of data on the links. The links include a first link (Link 1), a second link (Link 2), and a third link (Link 3). The links can be established between the same pair of LCBs or between different pairs of LCBs. For example, in the link cluster 500, Link 1 is one of the first link 504 or the second link 505 between the first LCB 501 and the second LCB 502. Link 2 is one of the third link 506 or the fourth link 507 between the first LCB 501 and the third LCB 503. Link 3 is one of the fifth link 508 or the sixth link 509 between the second LCB 502 and the third LCB 503.

As shown in FIG. 8, the connection events on the different links are provided without overlap in time and frequency. For example, at any time interval, the connection events on the three links are provided at three different frequencies or non-overlapping frequency ranges. The frequencies or frequency ranges of the connection events on the three links can change over different time intervals. The change over time of frequency for connection events on a link is also referred to herein as frequency hopping. For example, curve 810 represents a frequency hopping along the time range for connection events on Link 3. Frequency hopping is similarly provided for connection events on Link 1 and Link 2. At any frequency or frequency range, the time intervals of the connection events on different links also do not overlap. The combined frequency, or frequency range, and time interval provided for each connection event is referred to herein as a time and frequency resource block. For example, curve 810 traces the time and frequency resource blocks provided for connection events on Link 3 along the time range. In the connection events 800, the anchoring point and duration for each connection event is also chosen to provide non-overlapping time and frequency resource blocks among the connection events of the three links. The coordination parameters for scheduling the coordinated connection events 800 in the link cluster can be shared between the first LCB 501, second LCB 502, and third LCB 503. The coordination parameters indicate the frequencies or frequency ranges of the connection events on the three links. The coordination parameters can also include the anchoring point and duration for each connection event of the three links.

Figure 9:
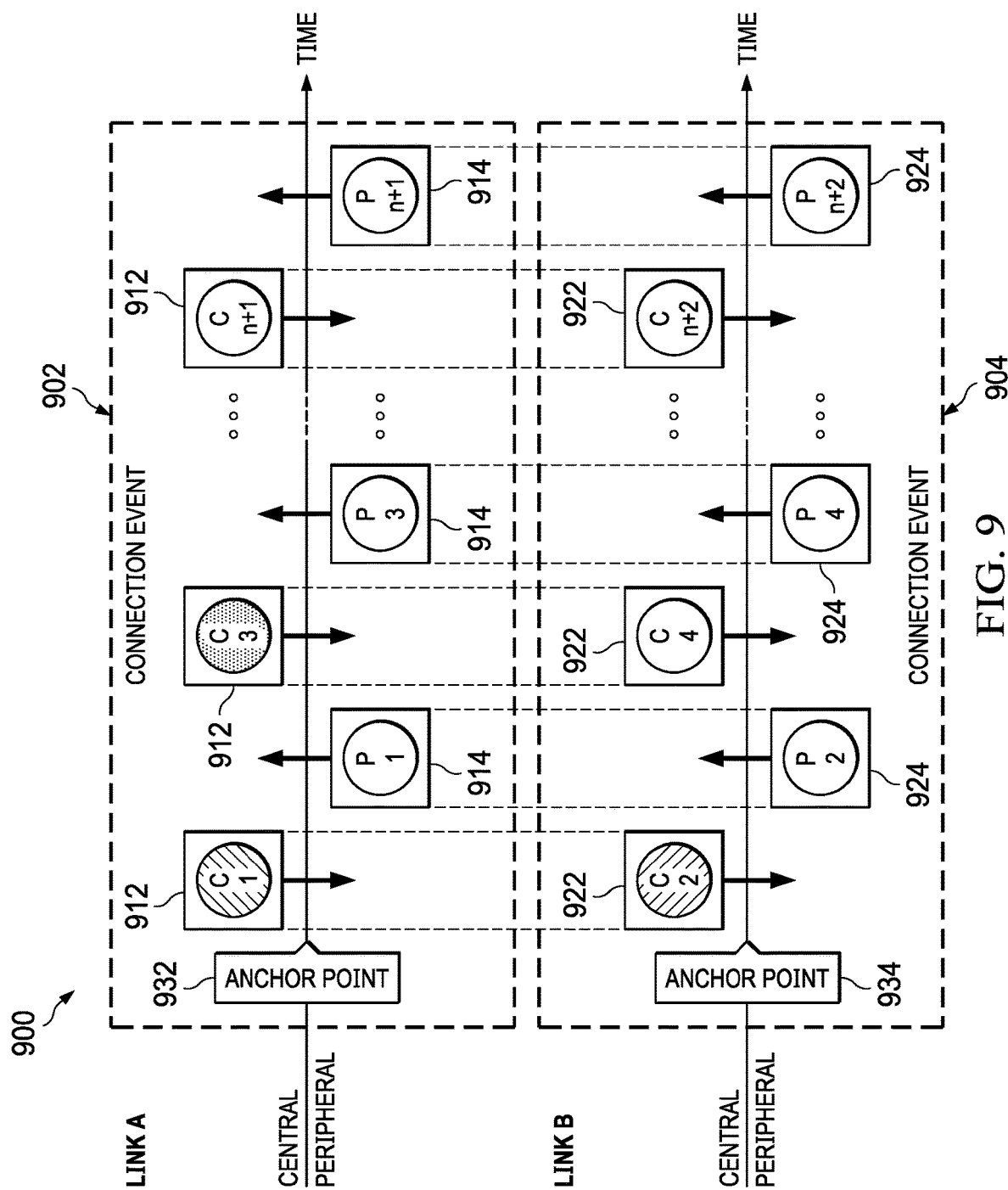
FIG. 9 is a diagram of synchronized packet transmission on multiple links in a link cluster, in accordance with various examples.

FIG. 9 is a diagram of synchronized packet transmission 900 on multiple links in a link cluster, in accordance with various examples. For example, the packets transmitted in a first connection event 902 on a first link is synchronized with the packets transmitted in a second connection event 904 on a second link. The first link (Link A) and the second link (Link B) may be established between a central device and the same peripheral device or between the central device and two respective peripheral devices. The first connection event 902 on Link A includes first transmission (TX) events 912 including data transmitted from the central device to the peripheral device, and first reception (RX) events 914 including data from the peripheral device by the central device. The data in first TX events 912 and the first RX events 914 can be transmitted as packets on Link A in consecutive and non-overlapping time intervals according to packet processing limitation of the BLE device architecture, which allows processing one packet at a time either for transmission or reception. In FIG. 9, the data as packets in the first TX events 912 and first RX events 914 are labeled $C_1, C_3, \ldots, C_{n+1}$ and $P_1, P_3, \ldots, P_{n+1}$, respectively. If a packet is received at approximately the same time interval another packet is being transmitted, one of the transmitted or received packets may be delayed or lost. The second connection event 904 on Link B includes second TX events 922 including data, such as packets, transmitted from the central device to the same or a second peripheral device, and second RX events 924 including data as packets received from the same or second peripheral device by the central device. The second TX events 922 and the second RX events 924 are also transmitted on Link B in consecutive and non-overlapping time intervals according to the BLE device architecture. The packets in the second TX events 922 and second RX events 924 are labeled $C_2, C_4, \ldots, C_{n+2}$ and $P_2, P_4, \ldots, P_{n+2}$, respectively.

To prevent packet delay or loss according to this BLE device architecture, the transmission of the packets in the first TX events 912 and first RX events 914 on Link A is synchronized with the transmission of second TX events 922 and second RX events 924 on Link B. This prevents time overlap of transmitted packets from the central device on Link A with received packets at the central device on Link B. For example, the time intervals of first TX events 912 on Link A from the central device do not overlap with the time intervals of second RX events 924 on Link B to the central device. Similarly, the synchronization prevents time overlap of transmitted packets from the peripheral device on Link A with received packets at the peripheral device on Link B. For example, the time intervals of first RX events 914 on Link A from the peripheral device do not overlap with the time intervals of second TX events 922 on Link B to the peripheral device. Accordingly, the time intervals of first TX events 912 on link A can overlap with the time intervals of second TX events 922 on Link B. The packets can be transmitted simultaneously in the overlapping time intervals of the first TX events 912 and second TX events 922. The time intervals of first RX events 914 on link A can overlap with the time intervals of second RX events 924 on Link B. The packets can be received simultaneously in the overlapping time intervals of the first RX events 922 and second RX events 924. The overlapping time intervals for transmitting and receiving the packets are time intervals that overlap in time. The packets can be transmitted and received in the overlapping time intervals on the different links at different frequencies.

In the synchronized packet transmission 900, the time intervals of the first connection event 902 on Link A overlaps with the second connection event 904 on Link B. Accordingly, a first anchor point 932 of the first connection event 902 and a second anchor point 934 of the second connection event 904 are configured to start packet transmission at approximately the same time. The duration of the first connection event 902 is also approximately equal to the duration of the second connection event 904. Each packet on Link A can be transmitted with a packet on Link B at a same respective time interval. The start and end times of the time intervals of the transmission events and reception events can also be configured, such as by the BLE PHY interface of the BLE link-cluster architecture 600 or 700, to provide approximately equal overlapping first time intervals of the transmission events on Link A and Link B and equal overlapping second time intervals of the reception events on the two links.

Figure 10:
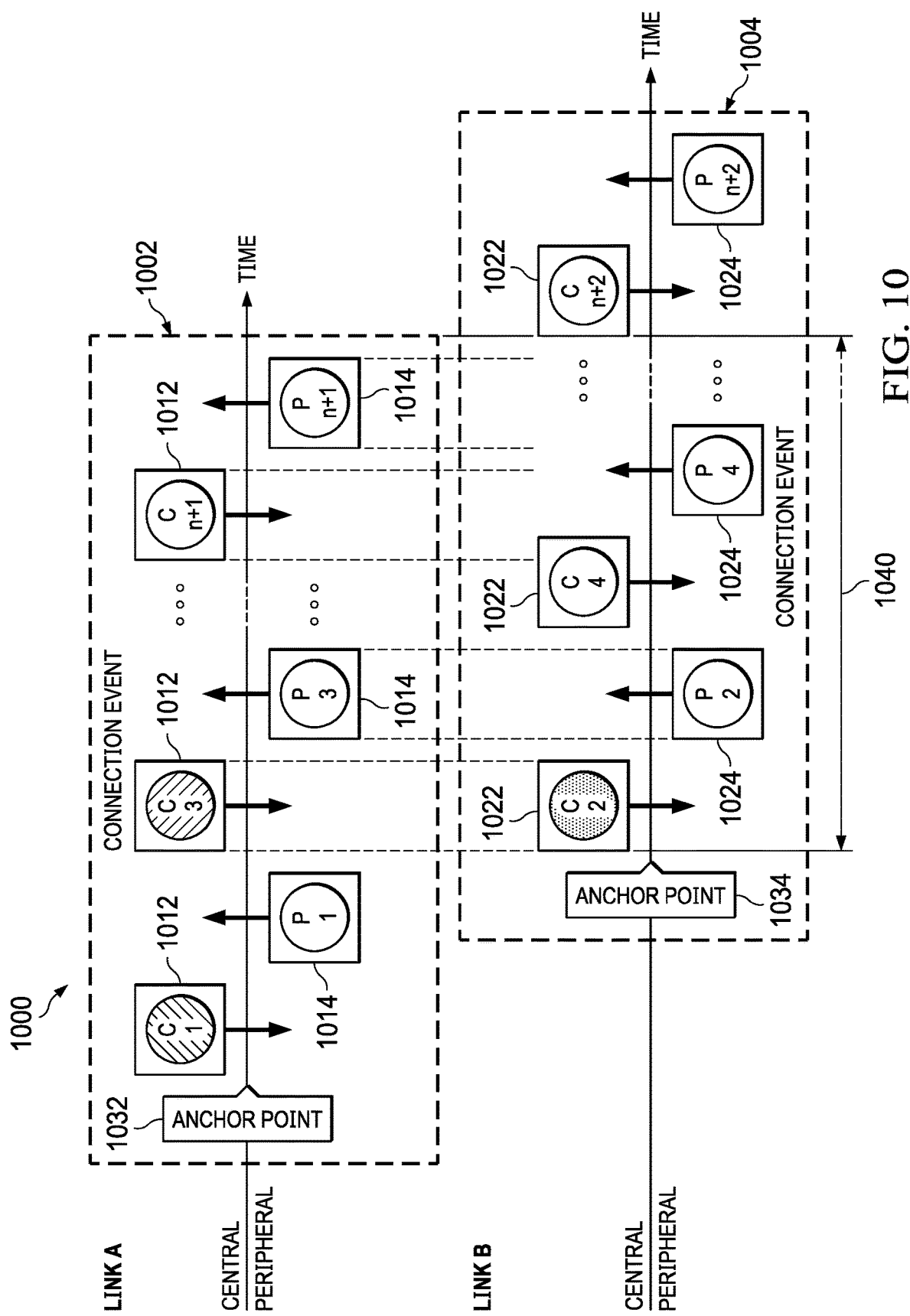
FIG. 10 is a diagram of synchronized packet transmission in partially overlapping connection events on multiple links in a link cluster, in accordance with various examples.

In other examples, the time intervals of connection events on multiple links in a link cluster may partially overlap. Because of the partial overlap of the connection events on multiple links, some of the packets on the multiple links can be transmitted at same receptive time intervals. FIG. 10 is a diagram of synchronized packet transmission 1000 in partially overlapping connection events on multiple links in a link cluster, in accordance with various examples. The connection events include a first connection event 1002 on a first link and a second connection event 1004 on a second link. The first link (Link A) and the second link (Link B) may be established between a central device and the same peripheral device or between the central device and two respective peripheral devices. The first connection event 1002 on Link A includes first TX events 1012 including data transmitted from the central device to the peripheral device, and first RX events 1014 including data received from the peripheral device by the central device. The data in the first TX events 1012 and the first RX events 1014 are transmitted on Link A in consecutive and non-overlapping time intervals according to the BLE device architecture. The data can be transmitted in the form of packets in the first TX events 1012 and first RX events 1014. In FIG. 10, the packets in the first TX events 1012 and first TX events 1014 are labeled $C_1, C_3, \ldots, C_{n+1}$ and $P_1, P_3, \ldots, P_{n+1}$, respectively. The second connection event 1004 on Link B includes second TX events 1022 including data, such as packets, transmitted from the central device to the same or a second peripheral device, and second RX events 1024 including data as packets received from the same or second peripheral device by the central device. The data on the second TX events 1022 and the fourth TX events 1024 are also transmitted on Link B in consecutive and non-overlapping time intervals. The packets in the second TX events 1022 and second RX events 1024 are labeled $C_2$, $C_4$, . . . , $C_{n+2}$ and $P_2$, $P_4$, . . . , $P_{n+2}$, respectively.

As shown in FIG. 10, the first anchor point 1032 of the first connection event 1002 is allocated at a time before the second anchor point 1034 of the second connection event 1004. This causes a partial overlap between the time intervals of the first connection event 1002 and the second connection event 1004. The duration of the second connection event 1004 may or may not be equal to the duration of the first connection event 1002. The duration of the overlap is referred to herein as an overlap time interval 1040.

In the overlap time interval 1040, the transmission of packets in the first TX events 1012 and first RX events 1014 on Link A is synchronized with the transmission of second TX events 1022 and second RX events 1024 on Link B. Accordingly, the time intervals of first TX events 1012 on Link A from the central device do not overlap with the time intervals of second RX events 1024 on Link B to the central device. The time intervals of first RX events 1014 on Link A from the peripheral device also do not overlap with the time intervals of second TX events 1022 on Link B to the peripheral device. The time intervals of first TX events 1012 on link A can overlap, in the overlap time interval 1040, with the time intervals of second TX events 1022 on Link B. The packets can be transmitted simultaneously in the overlapping time intervals of the first TX events 1012 and second TX events 1022. The time intervals of first RX events 1014 on link A can also overlap, in the overlap time interval 1040, with the time intervals of second RX events 1024 on Link B. The packets can be received simultaneously in the overlapping time intervals of the first RX events 1022 and second RX events 1024. The packets can be transmitted and received in the overlapping time intervals on the different links at different frequencies.

In the synchronized packet transmission 900 and the synchronized packet transmission 1000, the connection events on different links include different packets distributed and transmitted at approximately the same time intervals. Transmitting different packets on multiple links at approximately the same time intervals increases communication throughput. Distributing the packet transmission over multiple links also reduces latency, response time, and power consumption of the LCB.

Figure 11:
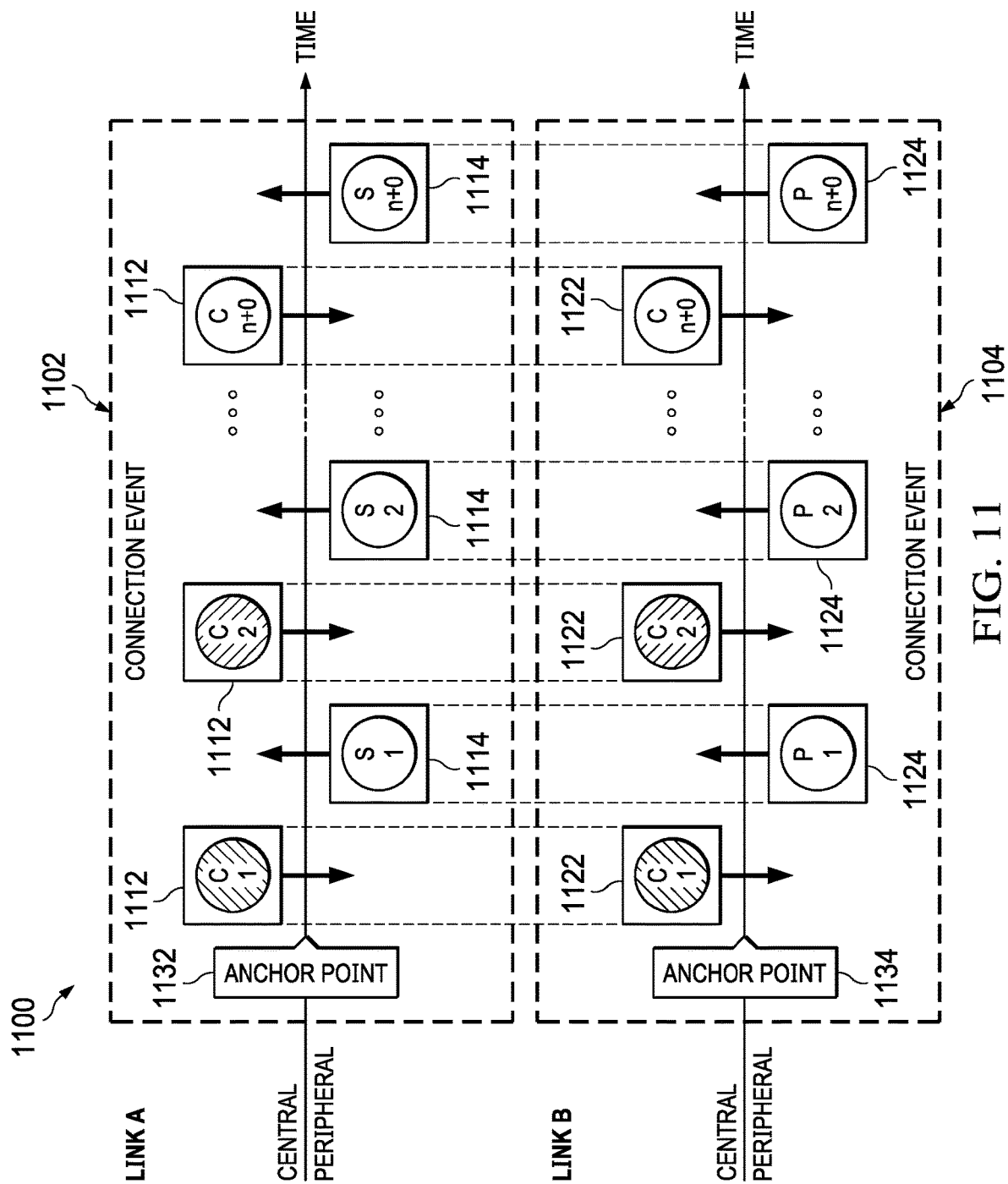
FIG. 11 is a diagram of synchronized duplicate packet transmission on multiple links in a link cluster, in accordance with various examples.

In other examples, the messages or packets can be replicated and transmitted over the multiple links to provide redundancy and accordingly increase the robustness of communications. FIG. 11 is a diagram of synchronized duplicate packet transmission 1100 on multiple links, in accordance with various examples. The packets transmitted in a first connection event 1102 on a first link is synchronized with the packets transmitted in a second connection event 1104 on a second link. The first link (Link A) and the second link (Link B) may be established between a central device and the same peripheral device or between the central device and two respective peripheral devices. The first connection event 1102 on Link A includes first TX events 1112 including data, such as packets, transmitted from the central device to the peripheral device, and first RX events 1114 including data as packets received from the peripheral device by the central device. The packets in the first TX events 1112 and the first RX events 1114 are transmitted on Link A in consecutive and non-overlapping time intervals according to the BLE device architecture. The second connection event 1104 on Link B includes second TX events 1122 including packets transmitted from the central device to the same or a second peripheral device, and second RX events 1124 including packets received from the same or second peripheral device by the central device. The packets in the second TX events 1122 and the second RX events 1124 are also transmitted on Link B in consecutive and non-overlapping time intervals. In FIG. 11, the duplicate packets in the first and second TX events 1112 and 1122 and the first and second RX events 1114 and 1124 are labeled $C_1$, $C_2$, . . . , $C_{n+0}$ and $P_1$, $P_2$, . . . , $P_{n+0}$, respectively.

The second connection event 1104 on Link B is redundant to the first connection event 1102 on Link A. Accordingly, the packets in the second TX events 1122 transmitted on Link B are duplicates of the packets in the first TX events 1112 transmitted on Link A. The packets in the second RX events 1124 transmitted on Link B are also duplicates of the packets in the first RX events 1114 transmitted on Link A. For example, the central device transmits the same set of packets in the first connection event 1102 on Link A and the redundant second connection event 1104 on Link B to the same peripheral device to increase the robustness of communications between the central device and the peripheral device. The time intervals of first TX events 1112 can overlap with the time intervals of second TX events 1122. The duplicate packets can be transmitted simultaneously in the overlapping time intervals of the first TX events 1112 and second TX events 1122. The time intervals of first RX events 1114 can also overlap with the time intervals of second RX events 1124. The duplicates of the packets can be received simultaneously in the overlapping time intervals of the first RX events 1122 and second RX events 1124. The overlapping time intervals of first TX events 1112 and second TX events 1122 do not overlap with the overlapping time intervals of first RX events 1114 and second RX events 1124. The duplicate packets can be transmitted and received in the overlapping time intervals on the different links at different frequencies.

The time interval of the first connection event 1102 on Link A overlaps with the time interval of the redundant second connection event 1104 on Link B. Accordingly, a first anchor point 1132 of the first connection event 1102 and a second anchor point 1134 of the redundant second connection event 1104 are configured to start packet transmission at approximately the same time. The duration of the first connection event 1102 is also approximately equal to the duration of the second connection event 1104.

Figure 12:
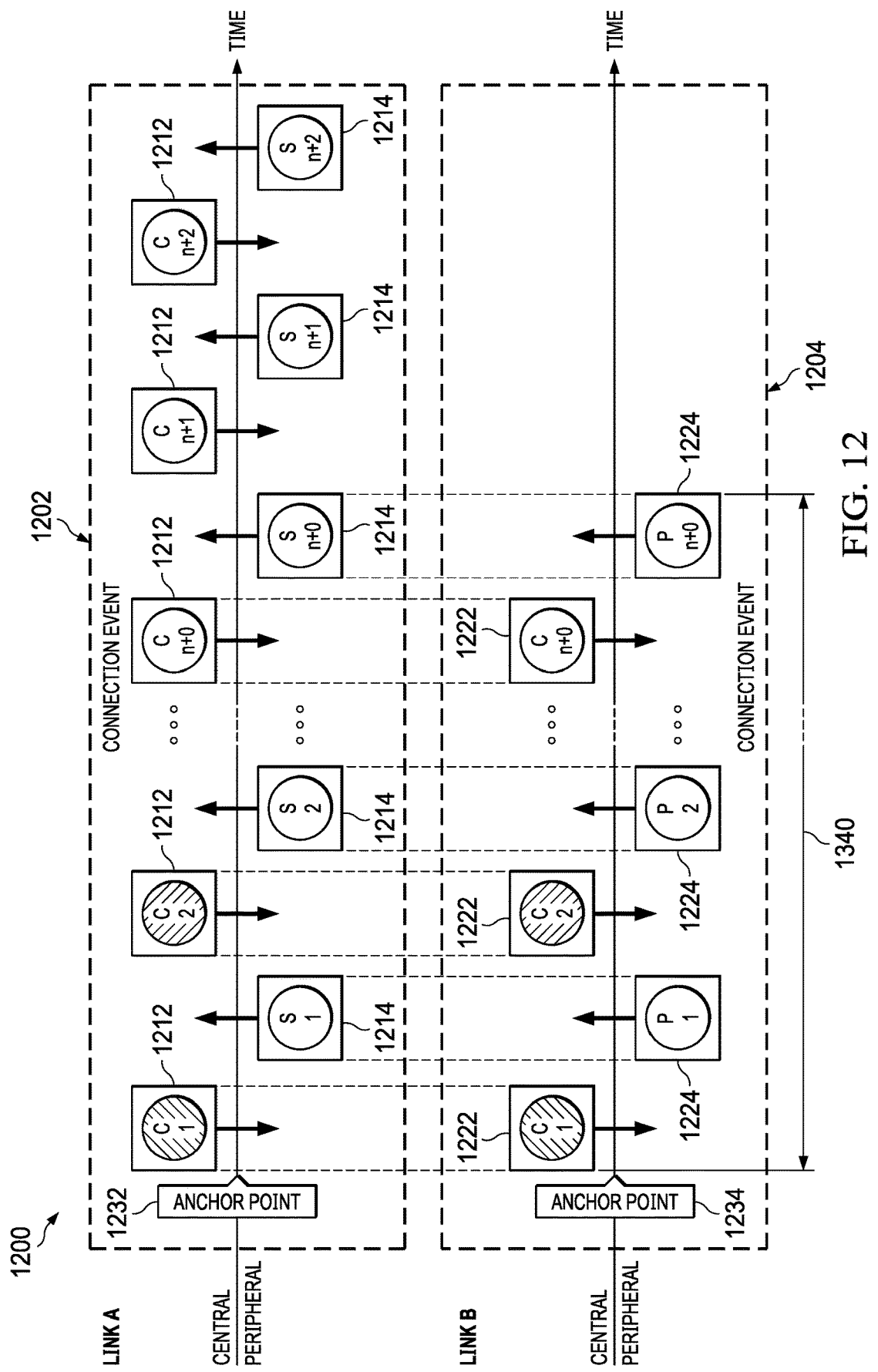
FIG. 12 is a diagram of synchronized duplicate packet transmission in partially overlapping connection events on multiple links in a link cluster, in accordance with various examples.

FIG. 12 is a diagram of synchronized duplicate packet transmission 1200 in partially overlapping connection events on multiple links in a link cluster, in accordance with various examples. The connection events include a first connection event 1202 on a first link and a second connection event 1204 on a second link. The first link (Link A) and the second link (Link B) may be established between a central device and the same peripheral device or between the central device and two respective peripheral devices. The first connection event 1202 on Link A includes first TX events 1212 including packets transmitted from the central device to the peripheral device, and first RX events 1214 including packets received from the peripheral device by the central device. The packets in the first TX events 1212 and the first RX events 1214 are transmitted on Link A in consecutive and non-overlapping time intervals according to the BLE device architecture. The second connection event 1204 on Link B includes second TX events 1222 including packets transmitted from the central device to the same or a second peripheral device, and second RX events 1224 including packets received from the same or second peripheral device by the central device. The packets in the second TX events 1222 and the second RX events 1224 are also transmitted on Link B in consecutive and non-overlapping time intervals. In FIG. 12, the duplicate packets in the first and second TX events 1212 and 1222 and the first and second RX events 1214 and 1224 are labeled $C_1, C_2, \ldots, C_{n+0}$ and $P_1, P_2, \ldots, P_{n+0}$, respectively.

As shown in FIG. 12, the first anchor point 1232 of the first connection event 1202 is allocated at approximately the same time as the second anchor point 1234 of the second connection event 1204. After the first anchor point 1232 and the second anchor point 1234, duplicate packets are transmitted in the first connection event 1202 and the second connection event 1204 in an overlap time interval 1240. In the overlap time interval 1240, the transmission of packets in the first TX events 1212 and first RX events 1214 on Link A is synchronized with the transmission of duplicate packets in the second TX events 1222 and second RX events 1224 on Link B. Accordingly, the time intervals of first TX events 1212 on Link A from the central device do not overlap with the time intervals of second RX events 1224 on Link B to the central device. The time intervals of first RX events 1214 on Link A from the peripheral device also do not overlap with the time intervals of second TX events 1222 on Link B to the peripheral device. The time intervals of first TX events 1212 on link A can overlap, in the overlap time interval 1240, with the time intervals of second TX events 1222 on Link B. The time intervals of first RX events 1214 on link A can also overlap, in the overlap time interval 1240, with the time intervals of second RX intervals 1224 on Link B. The duplicate packets can be transmitted simultaneously in the overlapping time intervals of the first TX events 1212 and second TX events 1222. The duplicates of the packets can also be received simultaneously in the overlapping time intervals of the first RX events 1222 and second RX events 1224. The duplicate packets can be transmitted and received in the overlapping time intervals on the different links at different frequencies.

Figure 13:
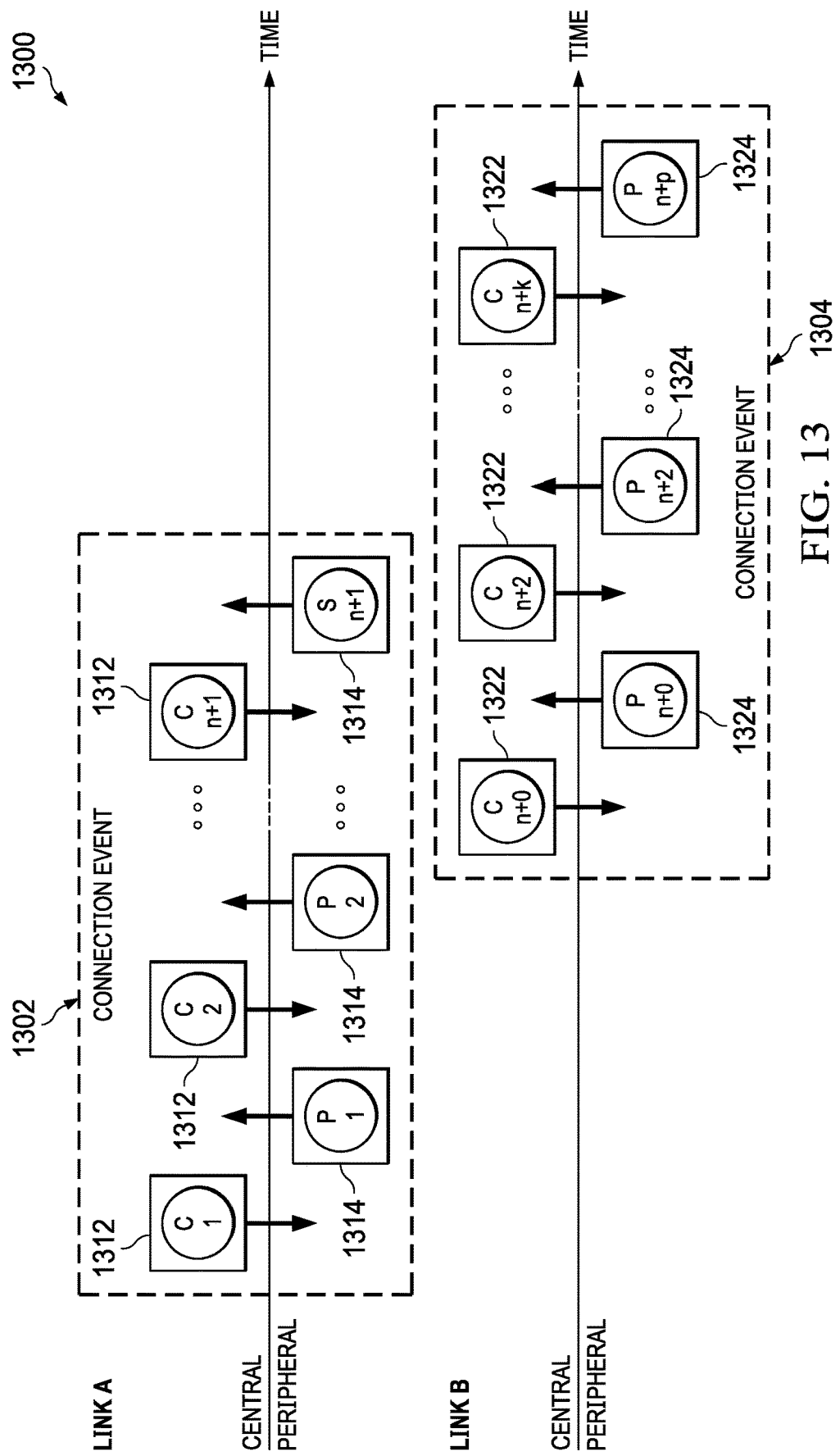
FIG. 13 is a diagram of packet transmission with synchronized packet rate and/or transmission power on multiple links in a link cluster, in accordance with various examples.

FIG. 13 is a diagram of packet transmission 1300 with synchronized packet rate and/or transmission power on multiple links in a link cluster, in accordance with various examples. The connections events include a first connection event 1302 on a first link and a second connection event 1304 on a second link. The first link (Link A) and the second link (Link B) may be established between a central device and the same peripheral device or between the central device and two respective peripheral devices. The first connection event 1302 on Link A includes first TX events 1312 including packets transmitted from the central device to the peripheral device, and first RX events 1314 including packets received from the peripheral device by the central device. The packets in the first TX events 1312 and the first RX events 1314 are transmitted on Link A in consecutive and non-overlapping time intervals according to the BLE device architecture. In FIG. 13, the packets in the first TX events 1312 and first RX events 1314 are labeled $C_1, C_2, \ldots, C_{n+1}$ and $P_1, P_2, \ldots, P_{n+1}$, respectively. The second connection event 1304 on Link B includes second TX events 1322 including packets transmitted from the central device to the same or a second peripheral device, and second RX events 1324 including packets received from the same or second peripheral device by the central device. The packets in the second TX events 1322 and the second RX events 1324 are also transmitted on Link B in consecutive and non-overlapping time intervals. The packets in the second TX events 1322 and second RX events 1324 are labeled $C_{n+0}, C_{n+2}, \ldots, C_{n+k}$ and $P_{n+0}, P_{n+2}, \ldots, P_{n+p}$, respectively.

As shown in FIG. 13, the first connection event 1302 and the second connection event 1304 may have different starting time. The first connection event 1302 and the second connection event 1304 may or may not have the same duration and may partially overlap. The packet transmission in the first connection event 1302 may not be synchronized in time with the packet transmission in the second connection event 1304. Accordingly, the time intervals of at least some of the first TX events 1312 on Link A from the central device may overlap with the time intervals of at least some of the second RX events 1324 on Link B to the central device. The time intervals of at least some of the first RX events 1314 on Link A from the peripheral device also may overlap with the time intervals of at least some of the second TX events 1322 on Link B to the peripheral device. The first TX events 1312 and first RX events 1314 on Link A can be synchronized according to the packet rate and/or the power of transmission with the second TX events 1322 and second RX events 1324 on Link B. For example, the first TX evets 1312 and second RX events 1324 in overlapping time intervals can be transmitted at different packet rates and/or transmission power. Similarly, the first RX events 1314 and second TX events 1322 in overlapping time intervals can be transmitted at different packet rates and/or transmission power. The packet rates and/or transmission power of the packets in the overlapping time intervals in the first connection event 1302 and second connection event 1304 are configured according to the BLE device architecture to increase throughput or robustness of communications on Link A and Link B.

Figure 14:
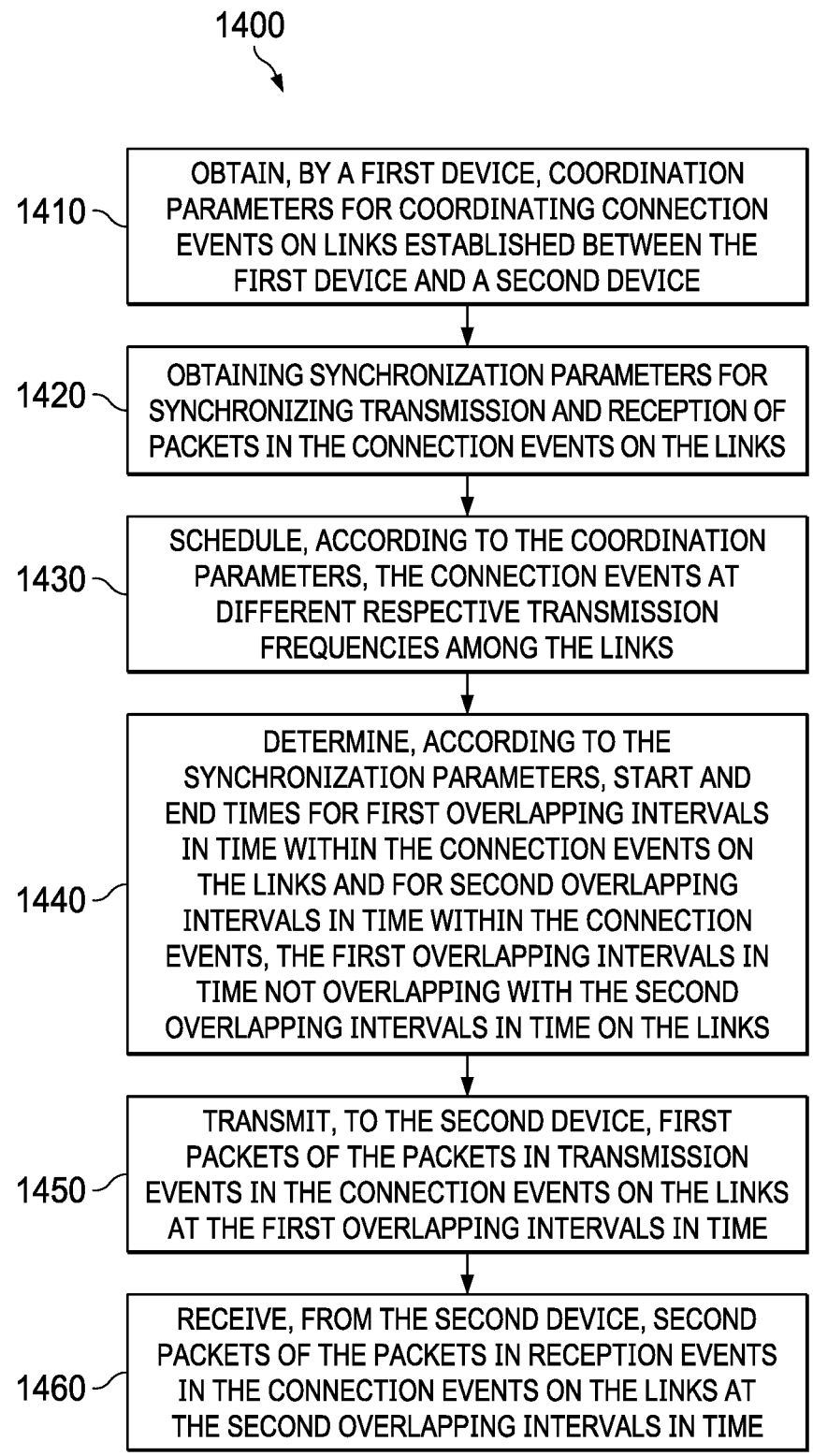
FIG. 14 is a flow diagram of a method for synchronizing packets transmitted on multiple links in a link cluster, in accordance with various examples.

FIG. 14 is a flow diagram of a method 1400 for synchronizing packets transmitted on multiple links in a link cluster, in accordance with various examples. The method 1400 can be performed by a LCB configured, according to a BLE device architecture, to transmit and receive packets in connection events on multiple links simultaneously. For example, according to the centralized BLE link-cluster architecture 600 or the distributed BLE link-cluster architecture 700, the first LCB 401 or 501 can exchange packets on each one of multiple links established with a second LCB in the link cluster 400 or 500.

At step 1410 of the method 1400, a first device obtains coordination parameters for coordinating connection events on links established between the first device and a second device. At step 1420, the first device obtains synchronization parameters for synchronizing transmission and reception of packets in the connection events on the links. The coordination and synchronization parameters can be exchanged between the LCBs in the link cluster before starting the connection events and transmitting the packets.

At step 1430, the device schedules, according to the coordination parameters, the connection events at different respective transmission frequencies among the links. The coordination of the connection events can include determining the anchoring points to start the connection events on the links, the respective transmission frequencies of the connection events on the different links, and the duration of each connection event on the links. At step 1440, the device determines, according to the synchronization parameters, start and end times for first overlapping intervals in time and second overlapping intervals in time within the connection events on the links. The first overlapping intervals in time do not overlap with the second overlapping intervals in time on the links. At step 1450, the device transmits at the first overlapping intervals in time, to the second device, first packets of the packets in transmission events in the connection events on the links at the first overlapping intervals in time. At step 1460, the device receives at the second overlapping intervals in time, from the second device, second packets of the packets in reception events in the connection events on the links. For example, the packets in the connection events on the links are provided according to any of the synchronized packet transmissions 900, 1000, 1100, 1200, or 1300. The synchronization of packets can include determining the direction, duration, rate, and/or power of packet transmission in the connection events on the links.

The term "couple" appears throughout the specification. The term may cover connections, communications or signal paths that enable a functional relationship consistent with this description. For example, if device A provides a signal to control device B to perform an action, in a first example device A is coupled to device B or in a second example device A is coupled to device B through intervening component C if intervening component C does not substantially alter the functional relationship between device A and device B such that device B is controlled by device A via the control signal provided by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device or a combination thereof.

An architecture or device that is described herein as including certain components may instead be adapted to be coupled to those components to form the described architecture or device.

Unless otherwise stated, "about," "approximately," or "substantially" preceding a value means+/−10 percent of the stated value. Modifications are possible in the described examples, and other examples are possible within the scope of the claims.

What is claimed is:

1. A device comprising:
    a link layer (LL) controller configured to:
        maintain links of a link cluster between the device and one or more connected devices that share parameters associated with the link cluster; and
        process packets associated with the links at a LL, the parameters including coordination parameters for connection events on the links and synchronization parameters for packet transmission in the connection events; and
    physical link (PHY) interfaces coupled to the LL controller and configured to:
        exchange the packets in the connection events on the links;
        interface with the LL controller; and
        process the packets at a PHY layer according to the parameters, wherein the PHY interfaces are configured to:
            exchange the packets in transmission events and reception events within the connection events at different respective transmission frequencies among the links of the link cluster; and
            determine start and end times for first overlapping intervals in time of the transmission events on the links and for second overlapping intervals in time of the reception events, the first overlapping intervals in time not overlapping with the second overlapping intervals in time on the links.

2. The device of claim 1, wherein the PHY interfaces are configured according to the parameters to:
    distribute the packets in the transmission events and the reception events within the connection events among the links;
    transmit first packets of the distributed packets on the links at first overlapping intervals in time of the transmission events; and
    receive second packets of the distributed packets on the links at second overlapping intervals in time that do not overlap with the first overlapping intervals in time.

3. The device of claim 1, wherein the PHY interfaces are configured according to the parameters to:
    distribute the packets in the transmission events and the reception events within the connection events among the links, the connection events partially overlapping on the links;
    transmit first packets of the distributed packets on the links at first overlapping intervals in time of the transmission events, the first overlapping intervals in time provided within a partial overlap time interval among the connection events; and
    receive second packets of the distributed packets on the links at second overlapping intervals in time that do not overlap with the first overlapping intervals in time, the second overlapping intervals in time also provided within the partial overlap time interval.

4. The device of claim 1, wherein the PHY interfaces are configured according to the parameters to:
    duplicate the packets in the transmission events and the reception events within the connection events among the links;
    transmit first duplicate packets of the packets on the links simultaneously at first overlapping intervals in time of the transmission events; and
    receive second duplicate packets of the packets on the links simultaneously at second overlapping intervals in time that do not overlap with the first overlapping intervals in time.

5. The device of claim 1, wherein the PHY interfaces are configured according to the parameters to:
    duplicate the packets in the transmission events and the reception events within the connection events among the links, the connection events partially overlapping on the links;
    transmit first duplicate packets of the packets on the links simultaneously at first overlapping intervals in time of the transmission events, the first overlapping intervals in time provided within a partial overlap time interval among the connection events; and
    receive second duplicate packets of the packets on the links simultaneously at second overlapping intervals in time that do not overlap with the first overlapping intervals in time, the second overlapping intervals in time also provided within the partial overlap time interval.

6. A device comprising:
    a link layer (LL) controller configured to:
        maintain links of a link cluster between the device and one or more connected devices that share parameters associated with the link cluster; and
        process packets associated with the links at a LL, the parameters including coordination parameters for connection events on the links and synchronization parameters for packet transmission in the connection events; and physical link (PHY) interfaces coupled to the LL controller and configured to:
exchange the packets in the connection events on the links;
interface with the LL controller; and
process the packets at a PHY layer according to the parameters, wherein the PHY interfaces are configured according to the synchronization parameters to transmit and receive the packets in transmission events and reception events within the connection events on the links at different rates, different power, or different rates and power between the transmission events and the reception events.

7. The device of claim 1, wherein the links connect the device to a same second device of the connected devices.

8. The device of claim 1, wherein the coordination parameters include anchoring points of the connection events on the links, respective transmission frequencies of the connection events on the links, and a duration of each one of the connection events on the links.

9. The device of claim 1, wherein the synchronization parameters include transmission direction, rate, power, and duration of transmission events and reception events of the packets in the connection events on the links.

10. The device of claim 1, wherein each of the PHY interfaces includes:
a PHY controller configured to interface with the LL controller and manage exchanging the packets on a respective link of the links in the link cluster;
a radio frequency (RF) front end (FE) configured to manage signal transmission and reception of the packets on the respective link; and
a RF antenna configured to transmit and receive signals on the respective link.

11. The device of claim 1, further including:
an application layer circuit configured to process data at an application layer;
a host layer circuit configured to manage host device functions and interface with the application layer circuit; and
a host to controller interface (HCI) configured to provide a communication interface between the host layer circuit and the LL controller.

12. A system comprising:
transceivers, each including:
a link layer (LL) controller configured to:
maintain links of a link cluster between a device and one or more connected devices that share parameters associated with the link cluster; and
process packets associated with the links at a LL, the parameters including coordination parameters for connection events on the links and synchronization parameters for packet transmission in the connection events; and
physical link (PHY) interfaces coupled to the LL controller and configured to:
exchange the packets in the connection events on the links;
interface with the LL controller; and
process the packets at a PHY layer according to the parameters; and
a modem, including:
an application layer manager configured to process data at an application layer;
a host layer manager configured to manage host device functions and interface with the application layer manager; and
a host to controller interface (HCI) configured to provide a communication interface between the host layer manager and the LL controller, wherein the PHY interfaces are configured according to the parameters to:
exchange the packets in transmission events and reception events within the connection events at different respective transmission frequencies on different links of the link cluster, the different links connecting each transceiver of the transceivers to a same device of the connected devices; and
determine start and end times for first overlapping intervals in time of the transmission events on the different links and for second overlapping intervals in time of the reception events, the first overlapping intervals in time not overlapping with the second overlapping intervals in time on the different links.

13. The system of claim 12, wherein each of the transceivers further includes:
a PHY controller configured to interface with the LL controller and manage exchanging the packets on a respective link of the links in the link cluster;
a radio frequency (RF) front end (FE) configured to manage signal transmission and reception of the packets on the respective link; and
a RF antenna configured to transmit and receive signals on the respective link.

14. The device of claim 1, wherein the LL controller is a BLUETOOTH low energy (BLE) LL controller, wherein the PHY interfaces are BLE PHY interfaces, and wherein the links of the link cluster are established according to a BLE communication standard.

15. The device of claim 1, wherein the different respective transmission frequencies are determined according to frequency hopping sequences.

16. The device of claim 15, wherein the frequency hopping sequences do not overlap in frequency and time.

17. The system of claim 12, wherein the LL controller is a BLUETOOTH low energy (BLE) LL controller, wherein the PHY interfaces are BLE PHY interfaces, and wherein the links of the link cluster are established according to a BLE communication standard.

18. The system of claim 12, wherein the different respective transmission frequencies are determined according to different frequency hopping sequences.

19. The device of claim 6, wherein the PHY interfaces are configured to exchange the packets in transmission events and reception events within the connection events at different respective transmission frequencies among the links of the link cluster.

20. The device of claim 6, wherein the links connect the device to a same second device of the connected devices.

* * * * *